(12) United States Patent
Sgouros et al.

(10) Patent No.: US 8,599,870 B2
(45) Date of Patent: *Dec. 3, 2013

(54) CHANNEL SERVICE MANAGER WITH PRIORITY QUEUING

(76) Inventors: Alexander Sgouros, Raleigh, NC (US); Vladislav Kopzon, Haifa (IL); Noam Halevy, Raanana (IL)

(*) Notice: Subject to any disclaimer, the term of this patent is extended or adjusted under 35 U.S.C. 154(b) by 0 days.

This patent is subject to a terminal disclaimer.

(21) Appl. No.: 13/602,226

(22) Filed: Sep. 3, 2012
(Under 37 CFR 1.47)

(65) Prior Publication Data
US 2012/0327951 A1    Dec. 27, 2012

(51) Int. Cl.
*H04L 12/28* (2006.01)

(52) U.S. Cl.
USPC .......................................................... 370/412

(58) Field of Classification Search
USPC ..................... 370/229, 395.42, 412
See application file for complete search history.

(56) References Cited

U.S. PATENT DOCUMENTS

| | | | | |
|---|---|---|---|---|
| 6,091,707 A | * | 7/2000 | Egbert et al. | 370/229 |
| 6,654,343 B1 | * | 11/2003 | Brandis et al. | 370/229 |
| 7,292,580 B2 | * | 11/2007 | Ramamurthy et al. | 370/395.42 |
| 8,259,738 B2 | * | 9/2012 | Sgouros et al. | 370/412 |

* cited by examiner

*Primary Examiner* — Mark Rinehart
*Assistant Examiner* — Gbemileke Onamuti

(57) ABSTRACT

A system and method are provided for prioritizing network processor information flow in a channel service manager (CSM). The method receives a plurality of information streams on a plurality of input channels, and selectively links input channels to CSM channels. The information streams are stored, and the stored the information streams are mapped to a processor queue in a group of processor queues. Information streams are supplied from the group of processor queues to a network processor in an order responsive to a ranking of the processor queues inside the group. More explicitly, selectively linking input channels to CSM channels includes creating a fixed linkage between each input port and an arbiter in a group of arbiters, and scheduling information streams in response to the ranking of the arbiter inside the group. Finally, a CSM channel is selected for each information stream scheduled by an arbiter.

28 Claims, 11 Drawing Sheets

CHANNEL SERVICE MANAGER WITH PRIORITY QUEUING

RELATED APPLICATIONS

This application is a Continuation of a patent application entitled, CHANNEL SERVICE MANAGER WITH PRIORITY QUEUING, invented by Alexander Sgouros et al, Ser. No. 11/799,438, filed May 1, 2007, which is incorporated herein by reference.

BACKGROUND OF THE INVENTION

1. Field of the Invention

This invention generally relates to digital packetized communications and, more particularly, to a channel service manager (CSM) system and method for prioritizing the flow of information streams into, and out of a network processor.

2. Description of the Related Art

As noted in U.S. Pat. No. 7,050,394, communicating over a network often involves a variety of tasks. For example, to send content (e.g., a web-page, e-mail, streaming video, etc.) from one device to another, the content is typically divided into portions carried by different packets. An individual packet includes a payload that stores some portion of the content being sent and a header that includes data used in delivering the packet to its destination. By analogy, the packet's payload is much like a letter being mailed while the header stores information (e.g., a network destination address) that appears on the envelope.

A typical router contains a line card for receiving data packets on one end, performing necessary conversions and sending out the packets at the other end. Among other components, line cards include a framer for framing/de-framing data packets, and a processor for performing protocol conversion and for controlling packet traffic. The framer communicates with the processor using a protocol such as SPI3 or SPI4 (system packet interface), which defines packet and cell transfer standards between a physical layer device (i.e., the framer) and a link layer device (i.e., the processor).

Generally, before transmission, a framer maps one or more packets (or packet portions) into a logical organization of bits known as a frame. In addition to packet data, a frame often includes flags (e.g., start and end of frame flags), a frame checksum that enables a receiver to determine whether transmission errors occurred, and so forth. The framer feeds frame bits to one or more devices that generate signals to be carried over a network connection. For example, for an optic signal, the framer feeds a serializer/deserializer (SERDES) and transceiver that generates optic signals representing the digital data of a frame.

Processing a received frame generally proceeds in the reverse of the process described above. That is, a device physically receives signals over a network connection, determines bit values corresponding to the signals, and passes the bits to a framer. The framer identifies frames within the bit stream and can extract packets stored within the frames.

In network terminology, the components described above perform tasks associated with different layers of a network communication "protocol stack." For example, the bottom layer, often known as the "physical layer", handles the physical generation and reception of signals. The "link layer" includes tasks associated with framing. Above the physical and link layers are layers that process packets (the "network layer") and coordinate communication between end-points (the "transport layer"). Above the transport layer sits the "application layer" that processes the content communicated.

Underrun and overrun are two common problems associated with the framing of data. Overrun involves the sending of too much data, or data at too high of a rate. In this case, data sent to the framer is lost before it can be buffered, which requires that the data be resent. Underrun is associated with sending too little data, or data at too slow of a rate. Some messaging protocols, such as Ethernet, are sensitive to underrun. Ethernet frames are only transmitted if they are "full" of data. Therefore, the transmission of entire Ethernet frames can be delayed as a result of underrun. Conventionally, the use of polling messages, which is a form of handshaking, addresses the overrun problem.

The conventional method of packet routing is called store-and-forward. In this method, a framing device accepts an input packet and buffers the entire packet on the ingress side of the link, knowing the exact number of cells in the packet. The problem with the store-and-forward method is the added latency and memory required to buffer the entire packet. Further, it is difficult to "fairly" serve a multi-channel system if one channel monopolizes the link for the transmission of an entire packet. In cut-through packet routing, a device is able to send the incoming packet cells to the correct egress port as soon as the destination address is known. In a multi-channel system, each remote link can be serviced more often, with smaller sized messages. However, the issue of scheduling transmissions becomes more problematic.

The problem of underrun is conventionally prevented by using significant hardware resources, including options such as dedicated datapath channels from the scheduler to the line interfaces, or large amounts of buffering to store-and-forward packets prior to transmission to the line interfaces. Alternatively, underrun-sensitive interfaces can be assigned a higher priority within a scheduler but this prioritization results in the overall fairness between non-underrun-sensitive and underrun-sensitive interfaces being compromised.

Conventional network processors provide limited support for multiple channelized interfaces, due to the fact that the processors must receive complete packets before they can start processing. Some network processor ingress interfaces have been designed with a small number of gigabit Ethernet ports, with internal buffering and simple packet-based round robin scheduling. Additionally, in the egress direction, network processors are known to introduce jitter in transmission, as a result of processing packets. Typically, there are no scheduling or queuing points in the egress directions, and traffic from network processor is simply demultiplexed out to the line port(s).

It would be advantageous if the flow of information streams into, and out of a network processor could be prioritizing, while optimizing the data flow.

SUMMARY OF THE INVENTION

The present invention describes a channel service manager (CSM) system and method that provides a common store-and-forward buffering point for multiple channelized interfaces, in the ingress scheduling to a network processor engine. The CSM prioritizes admission of ingress traffic coming from multiple line ports into the device. The CSM uses configurable strict priority (SP) and weighted round robin (WRR) scheduling algorithms to admit traffic. The CSM can prioritize traffic from underrun sensitive ports over non-underrun sensitive ports, and it can give weighted preference to higher bandwidth ports.

Ingress traffic can be assigned to different traffic flows based on the incoming link, and queued into configurable priority queues. In one aspect, the network processor has 2 separate traffic flow paths, a normal and extended processing path. The CSM permits traffic from multiple channelized ports to be queued in order of arrival for each channel. The user can then assign any number of channels to a set of 4 queues, 2 high and low priority queues for each of the 2 network processor paths.

The CSM provides an efficient store-and-forwarding function for ingress traffic using an external quad rate data (QDR) memory. The CSM uses a shared external QDR memory resource to store all packet traffic. Control overhead is also kept in the same memory and efficiently pre-fetched automatically such that its does not stall traffic flow. The CSM always presents a complete packet to the network processor. In addition, the CSM ensures that the network processor does not overflow, takes care of flow control to the line ports, and performs admission control functions.

The CSM performs priority scheduling of queued ingress traffic into network processor core. The user can program the CSM to give preference to its high priority queues and to one of the network processor flows, while at the same time ensuring a minimum bandwidth for the lower priority queues.

The CSM provides a channelized queuing interface from the network processor core, permitting packet reassembly of partial segments in a cut-through fashion, in the egress direction. Traffic exiting the network processor in the egress direction is chopped into segments among many channels. The purpose of the CSM is to reassemble these segments based on channel number, and store enough of the packet to begin transmitting to the line ports. The CSM on egress does not have to store the whole packet, only up to a configurable threshold.

The CSM performs underrun-aware priority scheduling based on configured thresholds to multiple line interfaces, eliminating the jitter introduced by conventional network processing. The CSM provides priority scheduling to the line ports, and performs simple traffic shaping. When starting to transmit a packet to a line port, the CSM ensures that it has stored a sufficient part of the packet so that it does not underrun the line port. This sufficient storage process also serves to remove any jitter introduced by packet processing in the network processor core. In addition, the CSM responds to flow control presented from the line ports, using backpressure to correct internal traffic flow.

The CSM provide a channelized loopback path from egress to ingress for further packet processing in the network processor core. Traffic exiting the network processor in need of additional processing is redirected as egress traffic back to a configured ingress interface, and rescheduled to the network processor. These loopback flows may be kept separate from other ingressing traffic, so that packet order is maintained in the system.

The CSM provide an external end-to-end flow control polling mechanism for attached devices. The CSM offers the ability to poll externally attached framers or other devices to determine their queue fullness levels. The CSM relates this information back to the on-chip traffic manager in order to regulate traffic flows to those queues.

Accordingly, a method is provided for prioritizing network processor information flow in a CSM. The method receives a plurality of information streams on a plurality of input channels, and selectively links input channels to CSM channels. The information streams are stored, and the stored the information streams are mapped to a processor queue in a group of processor queues. Information streams are supplied from the group of processor queues to a network processor in an order responsive to a ranking of the processor queues inside the group.

More explicitly, selectively linking input channels to CSM channels includes creating a fixed linkage between each input port and an arbiter in a group of arbiters, and scheduling information streams in response to the ranking of the arbiter inside the group. Then, a CSM channel is selected for each information stream scheduled by an arbiter. Scheduling information streams in response to the ranking of the arbiter inside the group includes linking a plurality of input ports to a high priority round robin (RR) arbiter, and linking a plurality of input ports to a low priority credit-based weighted round robin (WRR) arbiter. A strict priority arbiter is used to always schedule information streams from the high priority arbiter before information streams from the low priority arbiter.

In one aspect, storing the information streams includes creating a fixed linkage between each CSM channel and a corresponding ingress first-in-first-out (FIFO) lane in memory, and the stored information streams are mapped to the group of processor queues by creating a fixed linkage between a set of ingress FIFO lanes and a processor queue. Supplying information streams from the group of processor queues to a network processor includes establishing a high priority processor queue and low priority processor queue in each processor queue group. The high priority queue is granted credit, and information streams are supplied from the high priority queue until the credits are exhausted. Then, information streams are supplied from the high and low priority queues in a round robin fashion until the credits are reset.

Additional details of the above-described method and a CSM with a system for prioritizing network processor information flow are presented below.

DETAILED DESCRIPTION

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). It should be understood that software code stored in memory can be understood to be a computer-readable medium, or a signal bearing medium tangibly embodying a program of machine-readable instructions executable by a digital processing device.

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used.

Figure 1:
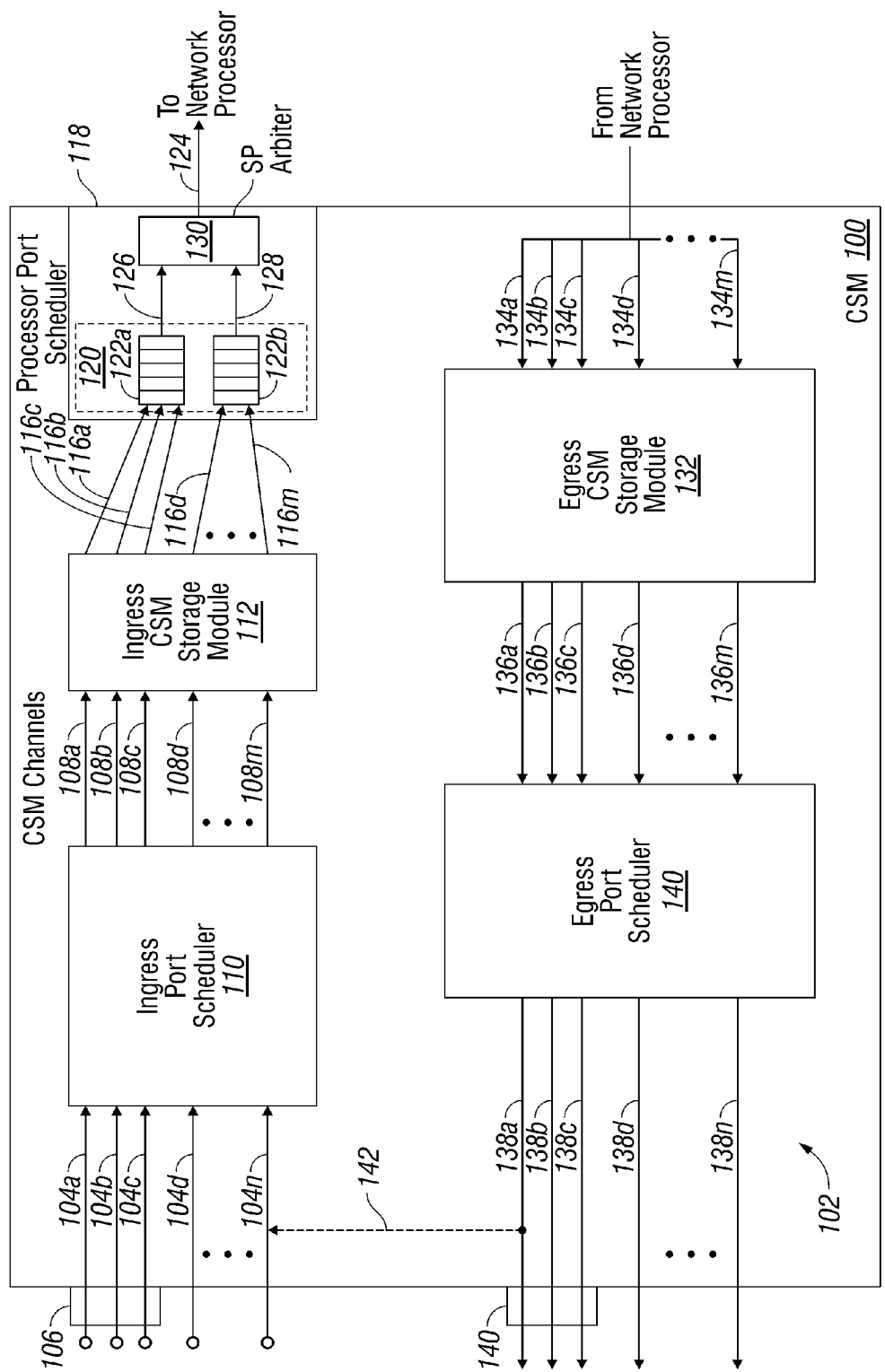
FIG. 1 is a schematic block is a channel service manager (CSM), with a system for prioritizing network processor information flow.

FIG. 1 is a schematic block is a channel service manager 100 (CSM), with a system for prioritizing network processor information flow. The system 102 comprises a plurality of input channels receiving a plurality of information streams on lines 104. Shown are input channels associated with lines 104a through 104n. Note: n is not limited to any particular number. In some aspects, multiple channels may be associated with an input port 106. Again, there is no particular limitation between a port and the number of channels. As used herein, an information stream may be a fixed length packet, variable length packet, a cell or group of cells from a packet, or any other logical segment of digital information.

The system 102 comprises a plurality of CSM channels on line 108. Shown are CSM channels a through m, where m is not limited to any particular number. In some aspects of the system, n=m. An ingress port scheduler 110 selectively links input channels 104 to CSM channels 108. An ingress CSM storage module 112 has inputs connected to the CSM channels 108 on lines 114a through 114m for the storage of information streams. The CSM storage module has a plurality of outputs on lines 116a through 116m. A processor port scheduler 118 includes a group 120 of processor queues 122. Shown are processor queues 122a and 122b. However, the system 102 is not limited to any particular number of processor queues in group 120. Each processor queue 122 is mapped to a plurality of ingress CSM storage module outputs on lines 116. The group 120 of processor queues supplies information streams to an ingress network processor port on line 124 in an order responsive to a ranking of the processor queues 122 inside the group 120.

Figure 2:
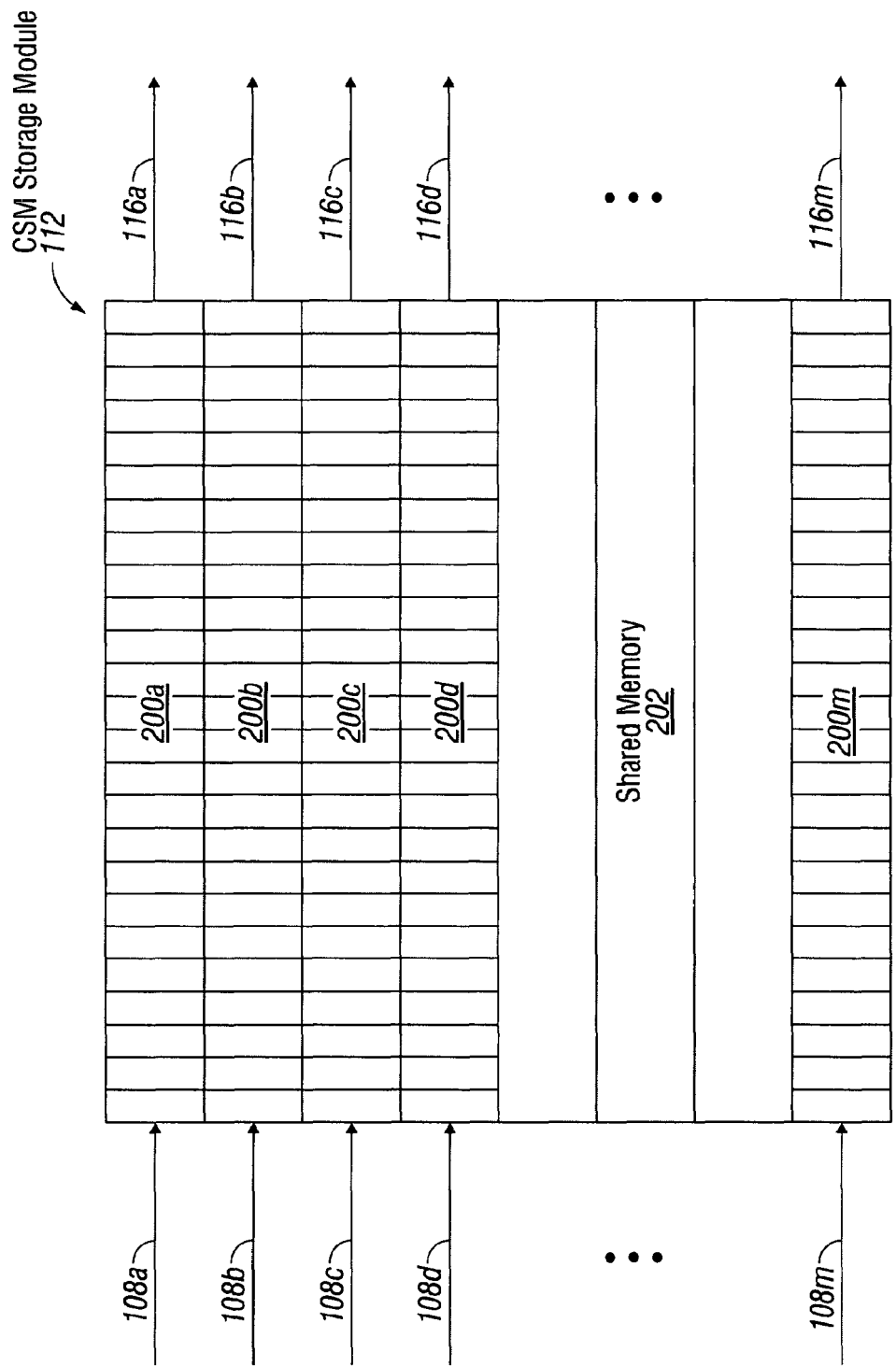
FIG. 2 is a schematic block diagram depicting the ingress CSM storage module in greater detail.

FIG. 2 is a schematic block diagram depicting the ingress CSM storage module in greater detail. The ingress CSM storage module 112 includes a plurality of ingress first-in first-out (FIFO) lanes 200a through m. The ingress CSM storage module 112 creates a fixed linkage between each CSM channel on line 108 and a corresponding ingress FIFO lane input. Likewise, a fixed linkage is created between a set of ingress FIFO lane outputs on line 116 and a processor queue 122 input. Note: the divisions shown in each FIFO lane 200 represent bytes, cells, or other segmentation of an information stream. Once the ingress CSM storage module has stored an information stream or packet, a header can be added, which may include the number of bytes (packet length), source port, time stamp, or lane assignment.

Figure 3:
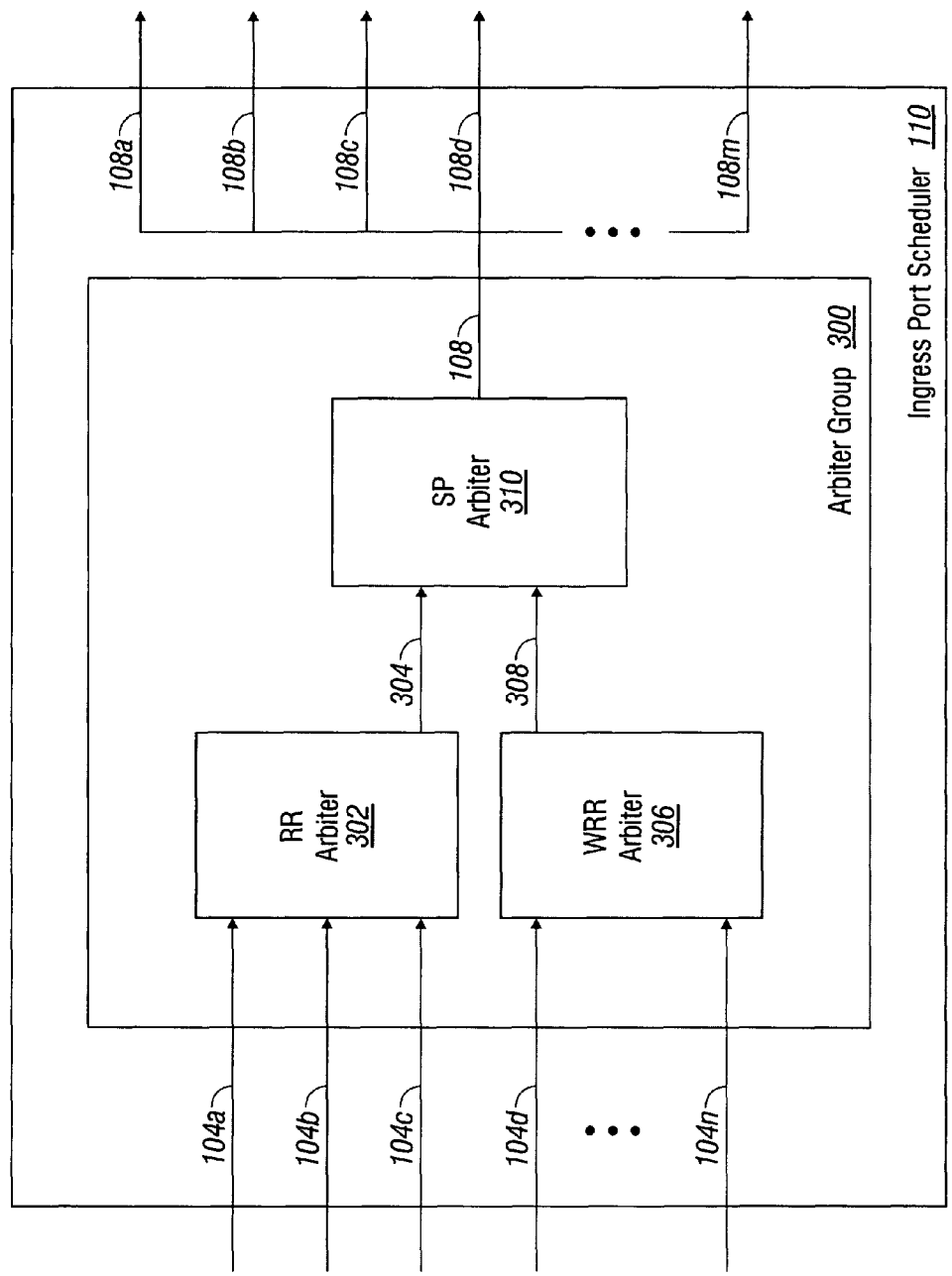
FIG. 3 is a schematic block diagram depicting the ingress port scheduler in greater detail.

FIG. 3 is a schematic block diagram depicting the ingress port scheduler in greater detail. The ingress port scheduler 110 includes a group 300 of arbiters. Here, a two-tier arrangement of arbiters is shown, with two arbiters in the first tier, and one arbiter in the second tier. However, the invention is not limited to any number of tiers or arbiters per tier. The ingress port scheduler 110 creates a fixed linkage between each input port 104 and an arbiter. Information streams are scheduled (from the ingress port scheduler) in response to the ranking of the arbiter inside the group. Then, a CSM channel on line 108 is selected for each information stream scheduled by an arbiter.

In the aspect shown, the group of arbiters 300 includes a high priority round robin (RR) arbiter 302 having inputs linked to a plurality of input ports (104a, 104b, and 104c), and an output on line 304. A RR arbiter assigns each input line a turn based upon "fairness", not upon any priority associated with the message, the input channel, or the source. A low priority credit-based weighted round robin (WRR) arbiter 306 has inputs linked to a plurality of input ports (104d and 104n), and an output on line 308. There are many types of weighted RR algorithms. A credit-based WRR arbiter may establish a credit scheme for each CSM channel. Once a CSM channel exhausts its credits, the WRR arbiter 306 ceases to transmit information streams to that CSM channel.

A strict priority (SP) arbiter 310 has inputs connected to the high priority and low priority arbiter outputs on lines 304 and 308, respectively. The SP arbiter 310 has an output selectively connected to the CSM channels on line 108, to schedule information streams from the high priority arbiter 302 before information streams from the low priority arbiter 306. Alternately stated, the final SP arbiter 310 chooses the high priority arbiter (RR) 302 over the low priority arbiter (WRR) 306 as long as the high priority write pipeline to memory is not full. If the high priority write pipeline to memory is full, the SP arbiter 310 chooses the low priority (if its write pipeline is not full). This is the only way that low priority can "win" over the high priority.

Returning to FIG. 1, the processor port scheduler group 120 of processor queues includes a high priority processor queue 122a having inputs connected to a plurality of ingress FIFO lane outputs on lines 116, and an output on line 126. A low priority processor queue 122b has inputs connected to a plurality of ingress FIFO lane outputs on line 116, and an output on line 128. The processor port scheduler 112 also includes a credit-based strict priority arbiter 130 having inputs connected to the high priority and low priority processor queue outputs on lines 126 and 128, respectively. The SP arbiter 130 has an output on line 124 to supply information streams from the high priority queue 122a until credits are exhausted, and to supply information streams from the high and low priority queues 122a/122b in a round robin fashion until the credits are reset.

Figure 4:
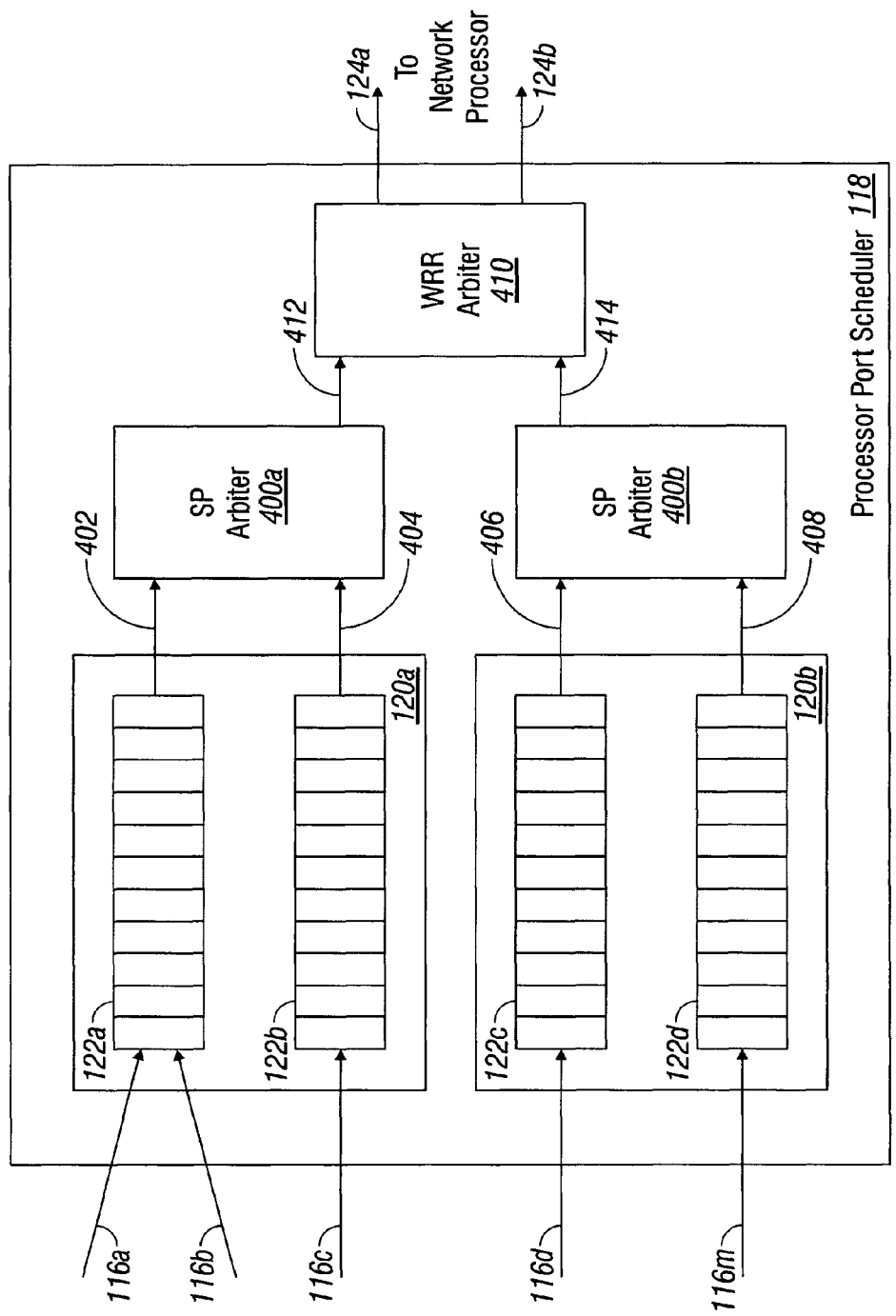
FIG. 4 is a schematic block diagram depicting the group of processor queues associated with the processor port scheduler in greater detail.

FIG. 4 is a schematic block diagram depicting the group of processor queues associated with the processor port scheduler in greater detail. The processor port scheduler 112 includes a plurality processor queue groups 120. Shown are processor queue groups 120*a* and 120*b*. However, it should be understood that the system 102 is not limited to any particular number of processor groups. Each processor queue group has outputs connected to a corresponding credit-based strict priority arbiter input. As shown, processor queue group 120*a* is connected to SP arbiter 400*a* on lines 402 and 404. Processor queue group 120*b* is connected to SP arbiter 400*b* on lines 406 and 408.

A WRR arbiter 410 has inputs connected to each credit-based strict priority arbiter output on lines 412 and 414. The WRR arbiter 410 supplies information streams from the plurality of processor queue groups to a plurality of ingress network processor ports in a weighted round robin fashion. As shown, there are two ingress ports to the network processor from the WRR arbiter 410 on lines 124*a* and 124*b*.

Returning to FIG. 2, in one aspect, the ingress CSM storage module 112 assigns a fixed memory allocation to each ingress FIFO lane. Each FIFO lane 200 fixed memory allocation is represented by a "row" in the CSM storage module 112. A plurality of ingress FIFO lanes are also granted access to a shared, dynamically allocated block of memory 202. This type of memory organization permits the CSM system to be used with fixed size packets like asynchronous transfer mode (ATM) cells, or varying length Ethernet packets.

The ingress CSM storage module 112 blocks a CSM channel 108 from supplying information streams to its corresponding ingress FIFO lane, in response to that ingress FIFO lane exceeding its fixed and dynamically allocated memory allocation. In that case, the ingress port scheduler (110, see FIG. 3) strict priority arbiter 310 selects an alternate information stream in response to the CSM channel being blocked, and the ingress port scheduler selects a CSM channel 108 for the alternate information stream.

Returning to FIG. 1, the system 102 may further comprise an egress CSM storage module 132 having a plurality of inputs on line 134*a* through 134*m* to store processed information streams received from an egress network processor port. The egress CSM storage module 132 has a plurality of outputs on lines 136*a* through 136*m*. Also shown is a plurality of output channels on lines 138*a* through 138*n*. Again, an output port 140 may be associated with a plurality of output channels. An egress port scheduler 140 has inputs connected to the egress CSM storage module outputs on lines 136. The egress port scheduler 140 maps stored processed information streams (in the egress CSM storage module 132) to the output channels on line 138 in response to a priority analysis. Then, the processed information streams are transmitted via the output channels on lines 138.

Figure 5:
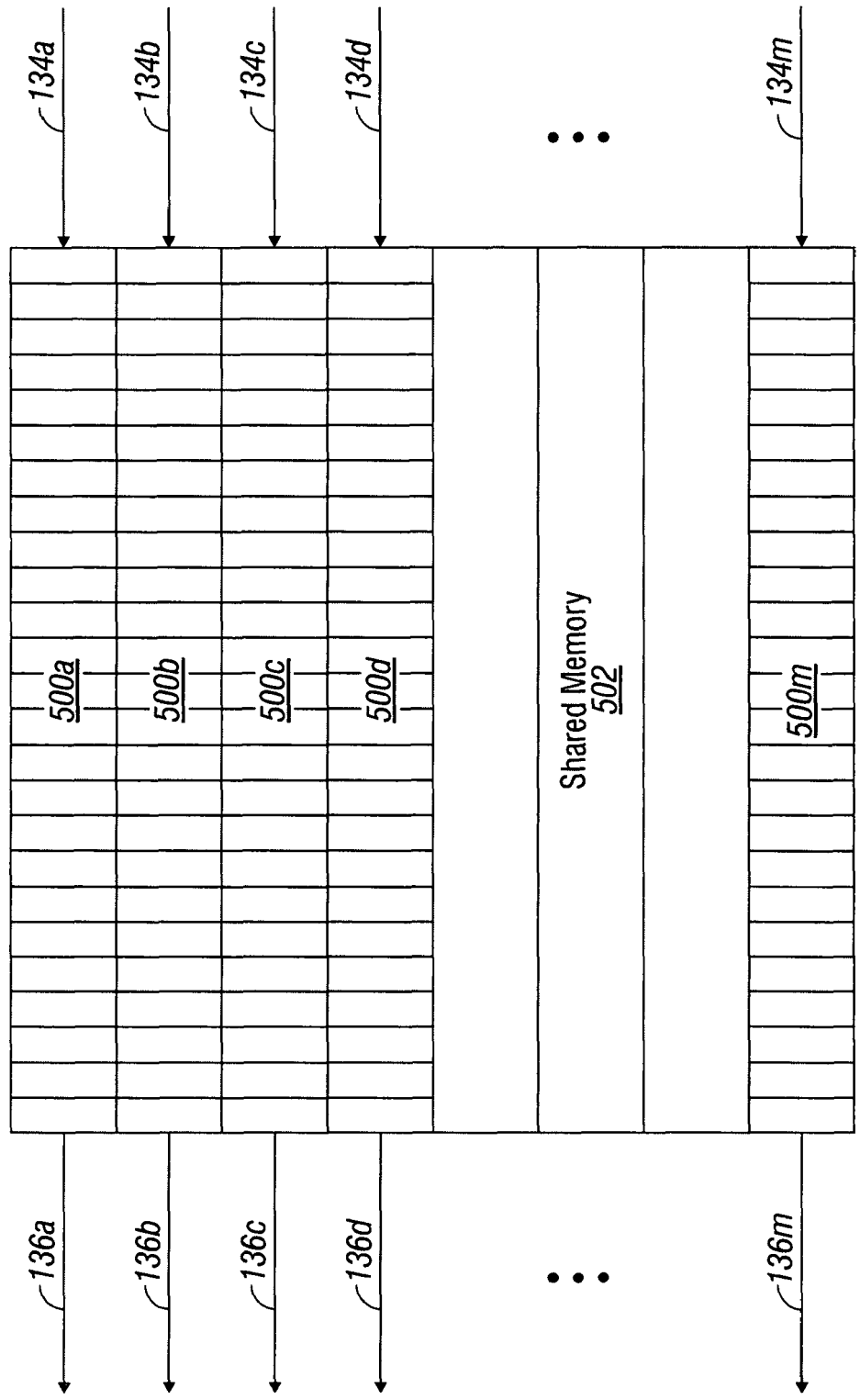
FIG. 5 is a schematic block diagram depicting the egress CSM storage module in greater detail.

FIG. 5 is a schematic block diagram depicting the egress CSM storage module in greater detail. The egress CSM storage module 132 includes a plurality of egress FIFO lanes 500*a* through 500*m*. The egress CSM storage module 500 receives processed information streams via a plurality of egress network processor channels 134, and creates a fixed linkage between each egress network processor channel and a corresponding egress FIFO lane input. Although FIG. 1 implies that there is only a single egress network processor port. However, there may be a plurality of egress network processor ports. In fact, there may be a processor port for every FIFO lane. Considering both FIGS. 1 and 5, the egress port scheduler 140 establishes a ranked order of egress FIFO lanes in the egress CSM storage module 112, and schedules processed information streams to output channels on lines 138 in response to an evaluation the egress FIFO ranking.

In one aspect, the egress CSM storage module 132 assigns a fixed memory allocation to each egress FIFO lane. Each FIFO lane 500 fixed memory allocation is represented by a "row" in the egress CSM storage module 132. In another aspect, the egress CSM storage module 132 grants a plurality of egress FIFO lanes access to a shared, dynamically allocated block of memory 502. Note: the divisions shown in each FIFO lane 500 represent bytes, cells, or other segmentation of an information stream.

In a different aspect, the egress CSM storage module 132 blocks network processor channel access to a linked egress FIFO lane via lines 134, in response to that egress FIFO lane exceeding its fixed and dynamically allocated memory allocation.

If an output channel 128 receives a backpressure signal from a destination receiving a processed information stream (the destination is not shown), then the egress FIFO lane assigned to the output channel ceases to supply the processed information stream in response to the backpressure signal.

In one aspect, the output channels, or some of the output channels 138 include loop-back connections to the input channels 104, to supply processed information stream for further processing. Shown is a loopback connection 142 connecting the output channel on line 138*a* to the input channel on line 140*n*. Alternately but not shown, the loopback connection may originate from the egress CSM storage module 132.

Various aspects of the above-described system can be realized in hardware, software, or using a combination of hardware and software elements.

Functional Description

In the ingress direction, the CSM can support multiple combinations of multi-channel (channelized) and single channel ports. A channel can be thought of as a transport element. These ports and channels must be mapped to a set of CSM ingress lanes, which are storage elements. For example, 128 CSM ingress lanes may be used. Only 1 CSM channel is be mapped to 1 CSM lane. These lanes are further mapped into a set of ingress processor queues, which are split into groups. For example, 4 queues may be divided into 2 groups. Each group has 2 queues, a high priority queue and a low priority queue. Each queue can have some, or all of the lanes mapped into it. Queues store packet headers which is the byproduct of one of the CSM functions, header promotion. The two groups of queues are then finally mapped to one of two processor channels, which again can be thought of as a transport element into the processor. A set of hierarchical schedulers establishes a weighted round robin scheme across the two processor queue groups. A strict priority with minimum rate guarantee scheduler is used across each of the two queues in each group. Each of the set of mappings from port to CSM channel, to CSM lane, to CSM queue, to network processor channel is fully configurable by the user.

Figure 6:
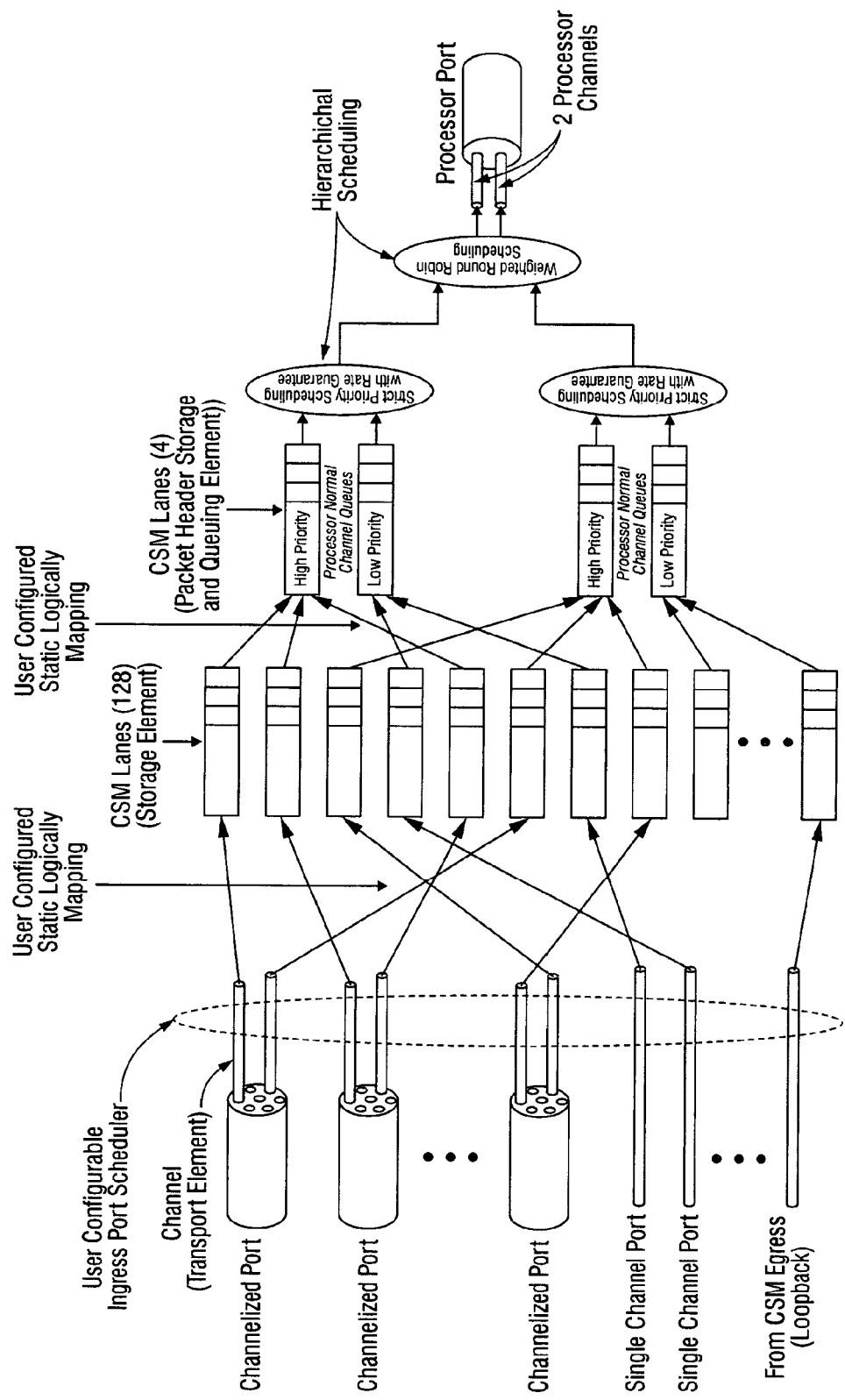
FIG. 6 is a schematic block diagram illustrating end-to-end ingress data flow mapping.

FIG. 6 is a schematic block diagram illustrating end-to-end ingress data flow mapping. Flexible data mapping and scheduling allows the user to dynamically configure streams of traffic with multiple classes of service, and give priority access to system resources to those streams with the highest COS. In addition, the CSM system is also capable of looping back multiple independent flows of traffic from the egress side back to the ingress side. This loopback may be used for cases where processed packets need additional processing. The loopback mechanism frees the system from the restriction of having to process all packets in a single pass through the network processor.

Figure 7:
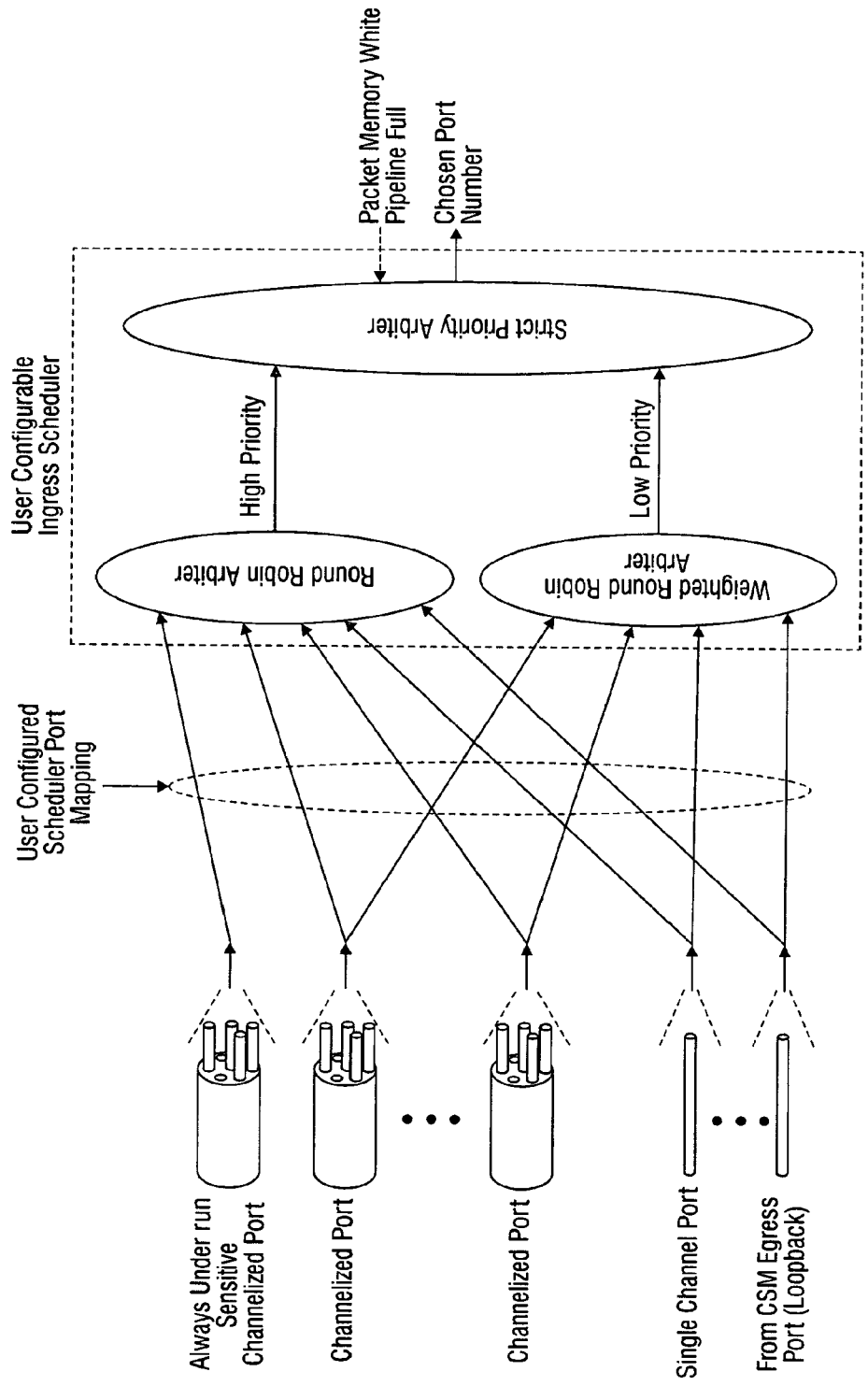
FIG. 7 is a diagram illustrating another aspect of the ingress port scheduler of FIG. 3.

FIG. 7 is a diagram illustrating another aspect of the ingress port scheduler of FIG. 3. Before ingress traffic can be sent to the CSM lane FIFOs, the ingress system must choose from which port it will take the next chunk of data. In order to do this, it utilizes a hierarchical hybrid programmable scheduler. The ingress port scheduler consists of two different $1^{st}$ line schedulers, a high priority round-robin arbiter, and a low priority weighted round-robin arbiter. These $1^{st}$ line schedulers then feed into a strict priority scheduler, which always chooses the high priority scheduler if any of its ports have traffic. The user can assign any port to any of the two schedulers as a configuration option. Typically, gigabit Ethernet (GE) ports are classified as always being underrun sensitive and are, therefore, assigned to the high priority port. Arbitration decisions are done on every clock, and each decision is worth only one transfer of data. This way, a user may decide which other ports are deemed high priority, and how traffic should be treated.

The ingress port scheduler also has a feedback mechanism from the internal write pipeline into the external packet memory, such that if it backs up, the ingress scheduler will cease admitting packets until the pipeline is ready. This initial scheduling point in the CSM serves to prioritize traffic on a per port basis, and permits underrun sensitive ports and other potentially high priority ports to be granted more bandwidth over lower priority ports. This configurability allows the user to shape the incoming traffic at a coarse level.

Figure 8:
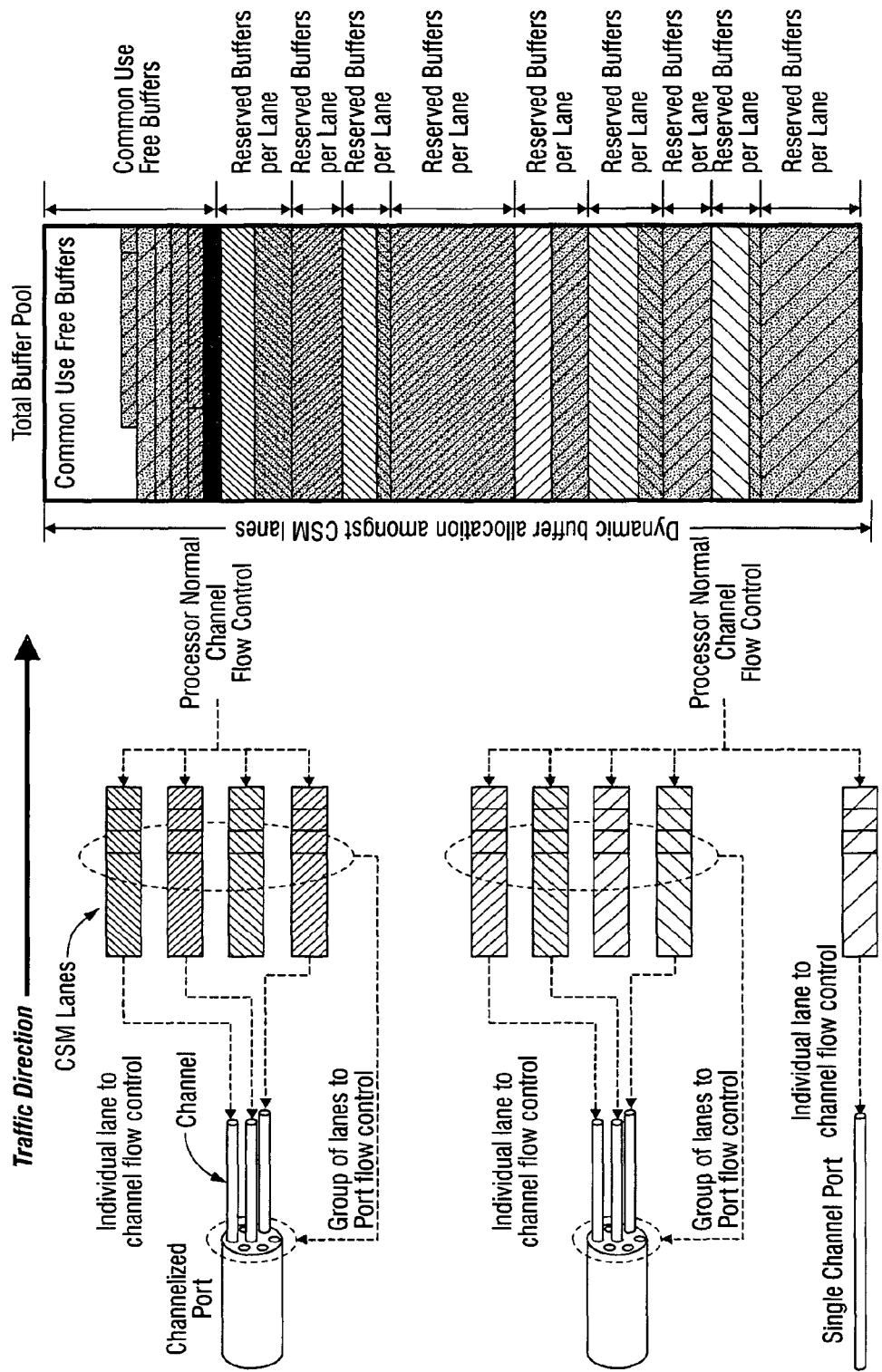
FIG. 8 is a diagram illustrating ingress dynamic buffer allocation and flow control mapping.

FIG. 8 is a diagram illustrating ingress dynamic buffer allocation and flow control mapping. Once data flow mapping has been established, the CSM flow control mapping falls out as a result. As stated previously, each channel within a port or each single-channeled port is mapped to a single (unique) CSM lane storage element. The CSM employs a dynamic buffer allocation scheme. This scheme permits the user to take the available memory space allocated to the CSM and reserve configurable chunks of it for each lane. The sum of the reservations is typically less than the total memory space. In addition, each lane may have access to an additional configurable amount of free buffers that can be dynamically allocated to any lane on a need basis. Once a lane starts using up all of its reserved and dynamically allocated buffers, the CSM lane can flow control directly the input CSM channel, causing the channel to stop sending data. The CSM absorb any in-flight traffic. In addition, the total number of buffers used by a group of lanes (belonging to a port) can be capped so that when that maximum is reached, the CSM will flow control the entire port. This means that all traffic for all channels in that port ceases transmitting data to the capped CSM channels.

This above-mentioned flow control scheme permits the CSM to effectively manage end-to-end traffic flow in the device without packet loss or corruption, while giving priority to streams of traffic with higher COS. This flow control enables the device to maintain multiple levels of COS from the ingress entry point to the processing stage.

Figure 9:
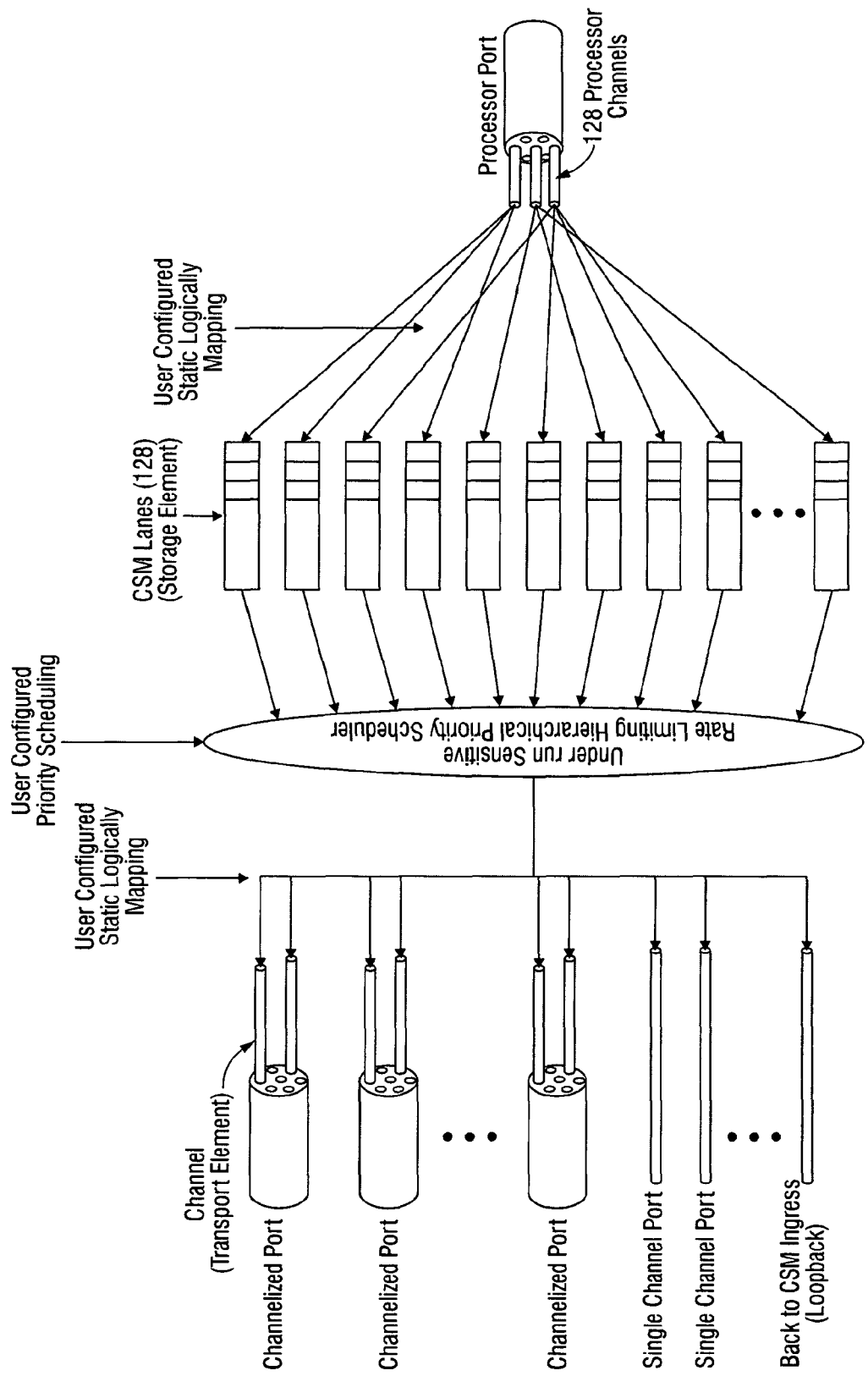
FIG. 9 is a diagram illustrating CSM egress data flow mapping.

FIG. 9 is a diagram illustrating CSM egress data flow mapping. In the egress direction, traffic flow is mapped much like the ingress direction except for that there are no separate queuing elements. Each CSM lane in the egress direction is essentially a queue by itself and there is no need for header promotion due to the fact that processing has already been completed on the packet. For this reason, the egress CSM operates in a cut-through fashion and requires a fraction of the memory required on the ingress side. The lanes (e.g., 128 lanes) in the egress CSM are first mapped to one of 128 channels available from the egress processing port, with only one channel being mapped to a single CSM lane. Each of the 128 channels from the processor allows the egress side of the device to transport up to 128 fragments of packets for 128 different traffic streams to the CSM. When they reach the CSM, the fragments are assembled and prepared for transmission. In turn, each of the 128 lanes in the egress CSM is further mapped to a port and channel, with no more than one lane being mapped to a single channel. An underrun sensitive, rate-limiting hierarchical priority scheduler is used to schedule amongst the 128 lanes and ensure that each channel and port are allocated their share of bandwidth based on throughput requirements, COS levels, and underrun sensitivity. The user can set the COS for a group of lanes by configuring more credits in the scheduler for them than for other lanes. Finally, if further processing is needed for some packets, the CSM can be configured to loop up CSM egress lanes back to the ingress side.

This combination of user configurable data flow mapping and advanced scheduling algorithms permits the CSM to maintain COS levels for many streams of traffic from the egress processing stage of the device out through the line ports. In addition, these features permit a combination of underrun sensitive ports (i.e., GE) and non-underrun sensitive ports to be active at the same time without affecting each other.

Figure 10:
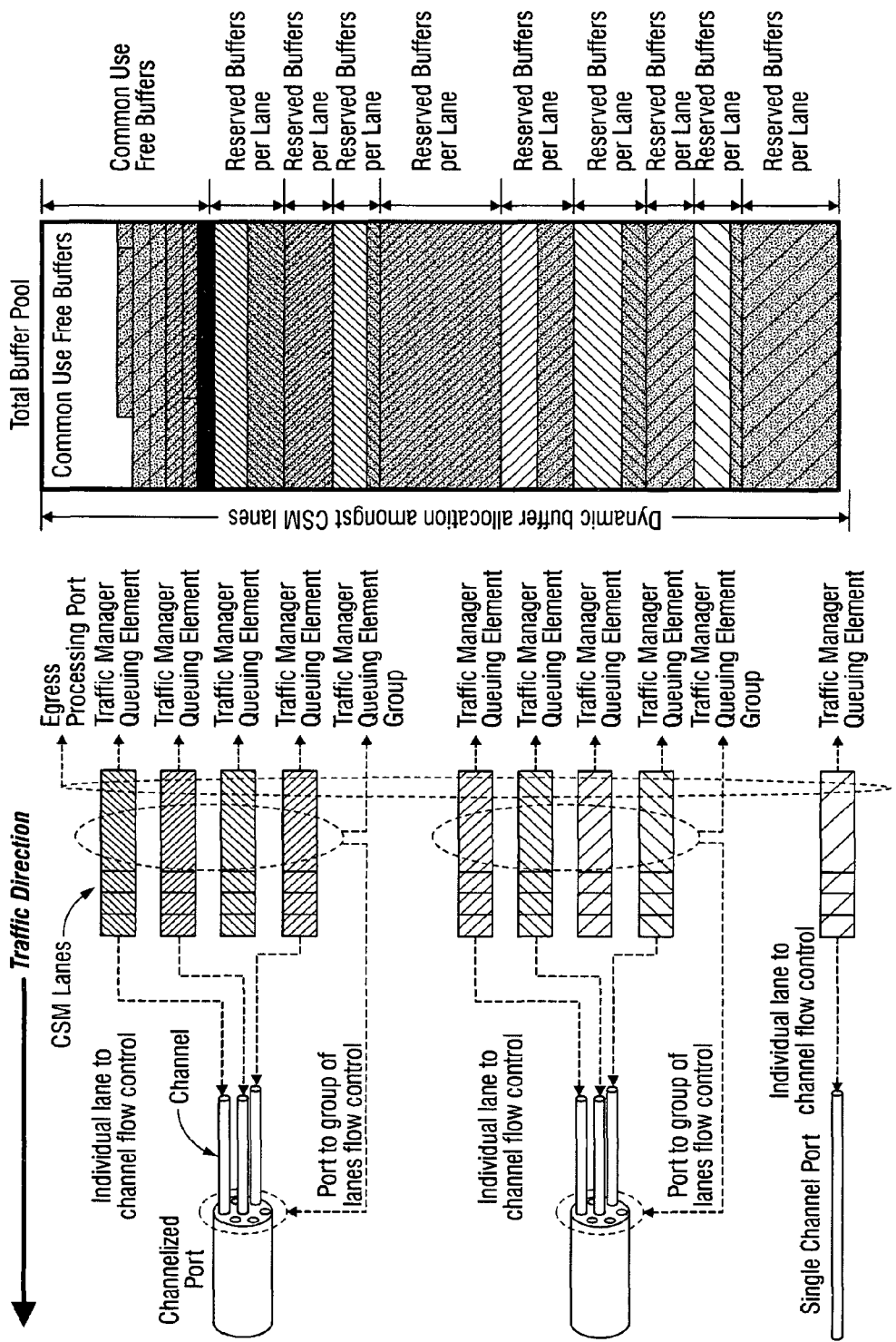
FIG. 10 is a diagram illustrating CSM egress dynamic buffer allocation and flow control mapping.

FIG. 10 is a diagram illustrating CSM egress dynamic buffer allocation and flow control mapping. In the egress direction, the CSM utilizes the same type of dynamic buffer allocation as described in the ingress flow. Flow control begins with the lines ports applying back pressure from their individual channels, to the corresponding mapped CSM lanes. In addition, the output port can signal flow control to the CSM to shut off transmission of all traffic for any of the channels in that port. Once a CSM lane FIFO level crosses its full threshold, the CSM can stop traffic coming to it from further upstream in the device. Each CSM lane is flow control mapped to a traffic manager queuing element, which is associated with the egress port scheduler (see FIG. 1). As each of the CSM lanes fill up and use their allotment of reserved and free buffers, the corresponding queuing element in the upstream traffic manager will be shut off and the CSM will absorb any in-flight traffic. In addition, groups of lanes can be associated together, most often corresponding to channels in a port, and the buffer usage of that port can be monitored. Once a programmable threshold is reached, the CSM can then flow control the entire group of traffic manager queuing elements that feed this CSM group of lanes. Finally, if all the egress memory buffers are used up, the CSM will flow control the entire egress processing port until memory space frees up.

This type of end-to-end flow control mapping, from the line ports and channels to the upstream traffic manager queues, permits the device to maintain COS levels on the egress path without corrupting or losing packets after the have been processed. If a downstream attached device experiences congestion, the CSM can relay that information to the on board traffic manager, which can then make intelligent drop decisions based on COS and system resource usage. Therefore, the CSM is an integral part of the efficient end-to-end data flow management device.

Figure 11:
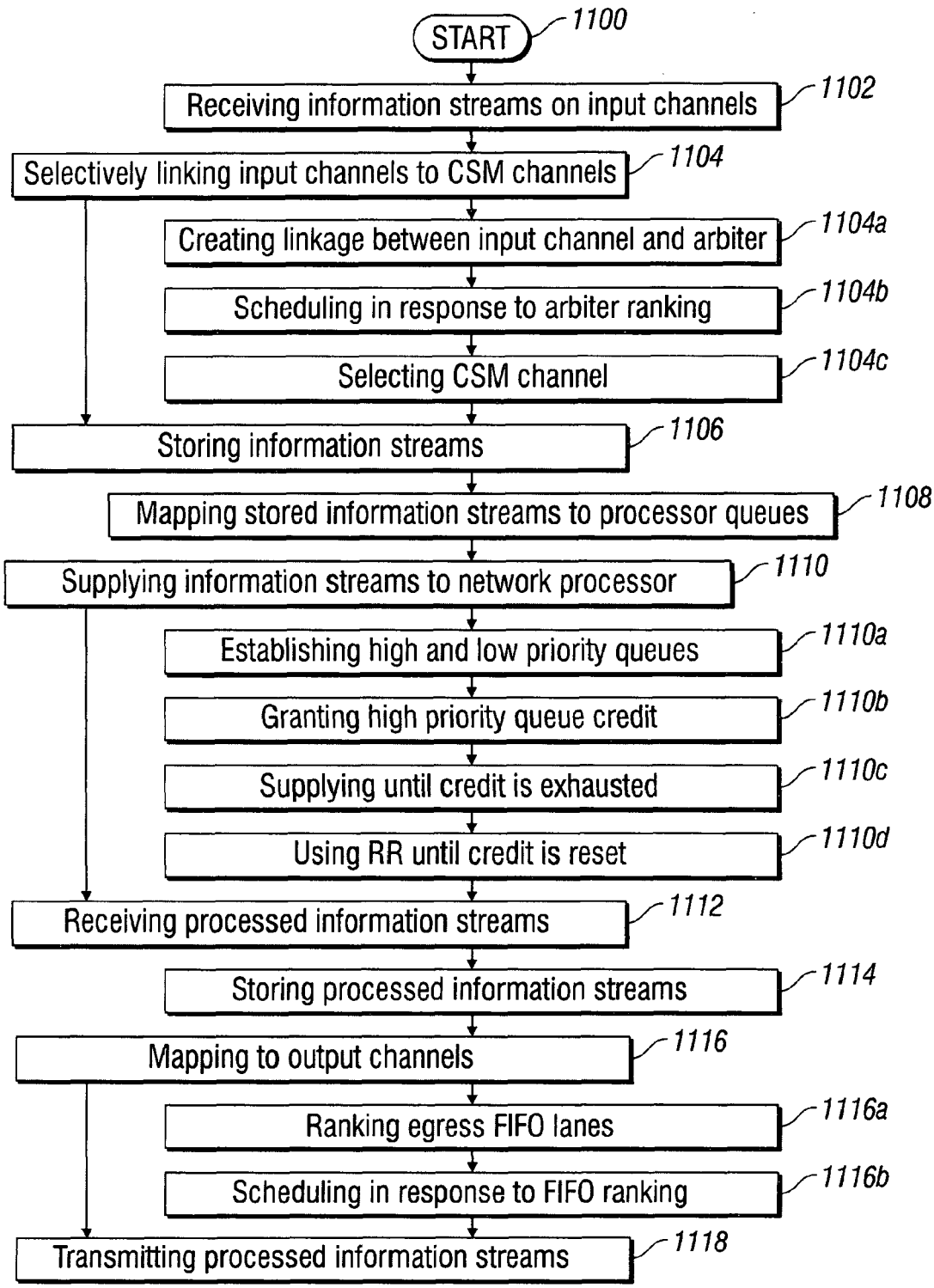
FIG. 11 is a flowchart illustrating a method for prioritizing network processor information flow in a CSM.

FIG. 11 is a flowchart illustrating a method for prioritizing network processor information flow in a CSM. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 1100.

Step 1102 receives a plurality of information streams on a plurality of input channels. Step 1104 selectively links input channels to CSM channels. Step 1106 stores the information streams. Step 1108 maps stored information streams to a processor queue in a group of processor queues. Step 1110 supplies information streams from the group of processor queues to a network processor in an order responsive to a ranking of the processor queues inside the group.

In one aspect, storing the information streams in Step 1106 includes creating a fixed linkage between each CSM channel and a corresponding ingress FIFO lane in memory. Then, mapping stored information streams to the group of processor queues in Step 1108 includes creating a fixed linkage between a set of ingress FIFO lanes and a processor queue.

In another aspect, selectively linking input channels to CSM channels in Step 1104 includes substeps. Step 1104a creates a fixed linkage between each input channel and an arbiter in a group of arbiters. Step 1104b schedules information streams in response to the ranking of the arbiter inside the group, and Step 1104c selects a CSM channel for each information stream scheduled by an arbiter.

For example, scheduling information streams in response to the ranking of the arbiter inside the group (Step 1104b) may include: linking a plurality of input ports to a high priority RR arbiter; linking a plurality of input ports to a low priority credit-based WRR arbiter; and, using a strict priority arbiter to schedule information streams from the high priority arbiter before information streams from the low priority arbiter.

In one aspect, supplying information streams from the group of processor queues to a network processor in Step 1110 includes substeps. Step 1110a establishes a high priority processor queue and low priority processor queue in each processor queue group. Step 1110b grants the high priority queue credit. Step 1110c supplies information streams from the high priority queue until the credits are exhausted. Then, Step 1110d supplies information streams from the high and low priority queues in a round robin fashion until the credits are reset.

In another aspect, supplying information streams from the group of processor queues to a network processor is Step 1110 includes: establishing a plurality processor queue groups selectively linked to a plurality of network processor ports; and, supplying information streams from the plurality of groups to the plurality of network processor ports in a weighted round robin fashion.

In a different aspect, mapping the information streams into the plurality of ingress FIFO lanes in memory (Step 1108) includes: establishing a fixed memory allocation for each ingress FIFO lane; and, granting a plurality of ingress FIFO lanes access to a shared, dynamically allocated block of memory. In one variation, Step 1108 blocks a CSM channel from supplying information streams to its corresponding ingress FIFO lane, in response to that ingress FIFO lane exceeding its fixed and dynamically allocated memory allocation. Then, using the strict priority arbiter to always schedule information streams from the high priority arbiter before information streams from the low priority arbiter (Step 1104b) includes: the strict priority arbiter selecting an alternate information stream in response to the CSM channel being blocked; and, selecting a CSM channel for the alternate information stream.

In another aspect of the method, Step 1112 receives processed information streams from the network processor. Step 1114 stores the processed information streams. In response to a priority analysis, Step 1116 maps stored processed information streams to output channels, and Step 1118 transmits processed information streams via the output channels.

In one aspect, receiving processed information streams from the network processor in Step 1112 includes receiving processed information streams via a plurality of network processor channels. Storing the processed information streams in Step 1114 includes creating a fixed linkage between each network processor channel and a corresponding egress FIFO lane. Then, mapping stored processed information streams to output channels in Step 1116 includes substeps. Step 1116a establishes a ranked order of egress FIFO lanes, and Step 1106b schedules processed information streams to output channels in response to an evaluation the egress FIFO ranking.

In another variation, mapping stored processed information streams to output channels in Step 1116 includes: establishing a fixed memory allocation for each egress FIFO lane; and, granting a plurality of egress FIFO lanes access to a shared, dynamically allocated block of memory. Further, Step 1116 may block network processor channel access to a linked egress FIFO lane, in response to that egress FIFO lane exceeding its fixed and dynamically allocated memory allocation.

In another aspect, transmitting processed information streams via the output channels in Step 1118 includes: an output channel receiving a backpressure signal from a destination receiving a processed information stream; and, the egress FIFO lane assigned to the output channel ceasing the supply of the processed information stream in response to the backpressure signal.

In another variation, transmitting processed information streams via the output channels in Step 1118 includes looping a processed information stream back to an input channel for further processing.

A system and method have been presented for prioritizing network processor information flow in a CSM. Some examples of message formats, circuit designs, and communication scenarios have been provided to illustrate the invention. However, the invention is not limited to merely these examples. Other variations and embodiments of the invention will occur to those skilled in the art.

We claim:

1. In a channel service manager (CSM), a method for prioritizing network processor information flow, the method comprising:
   receiving a plurality of information streams on a plurality of input channels;
   selectively linking input channels of the plurality to CSM channels;
   creating with an ingress port scheduler fixed linkages between a first group of input channels of the plurality and a first arbiter and between a second group of input channels of the plurality and a second arbiter during said selectively linking, wherein the first arbiter uses a first selection mechanism to choose between information streams in the first group of input channels and the second arbiter uses a second selection mechanism to choose between information streams in the second group of input channels, the ingress port scheduler scheduling information streams selected by the first and second arbiters in response to the ranking of the arbiter inside the group, and selecting a CSM channel for at least one information stream scheduled by an arbiter;
   storing the information streams in CSM ingress first-in first-out (FIFO) lanes;
   minimizing data underflow with a reserved dynamic buffer memory allocation of a CSM ingress FIFO lane;
   mapping stored information streams to a processor queue in a group of processor queues; and, supplying information streams from the group of processor queues to a network processor in an order responsive to a ranking of the processor queues inside the group.

2. The method of claim 1 wherein storing the information streams includes creating a fixed linkage between each CSM channel and a corresponding FIFO lane in memory; and,
wherein mapping stored information streams to the group of processor queues includes creating a fixed linkage between a set of ingress FIFO lanes and a processor queue.

3. The method of claim 2 wherein selectively linking input channels to CSM channels includes:
creating a fixed linkage between each input channel and an arbiter in a group of arbiters;
scheduling information streams in response to the ranking of the arbiter inside the group; and,
selecting a CSM channel for each information stream scheduled by an arbiter.

4. The method of claim 3 wherein scheduling information streams in response to the ranking of the arbiter inside the group includes:
linking a plurality of input ports to a high priority round robin (RR) arbiter;
linking a plurality of input ports to a low priority credit-based weighted round robin (WRR) arbiter; and,
using a strict priority arbiter to schedule information streams from the high priority arbiter before information streams from the low priority arbiter.

5. The method of claim 2 wherein supplying information streams from the group of processor queues to a network processor includes:
establishing a high priority processor queue and low priority processor queue in each processor queue group;
granting the high priority queue credit;
supplying information streams from the high priority queue until the credits are exhausted; and,
supplying information streams from the high and low priority queues in a round robin fashion until the credits are reset.

6. The method of claim 5 wherein supplying information streams from the group of processor queues to a network processor includes:
establishing a plurality processor queue groups selectively linked to a plurality of network processor ports; and,
supplying information streams from the plurality of groups to the plurality of network processor ports in a weighted round robin fashion.

7. The method of claim 4 wherein mapping the information streams into the plurality of ingress FIFO lanes in memory includes:
establishing a fixed memory allocation for each ingress FIFO lane; and,
granting a plurality of ingress FIFO lanes access to a shared, dynamically allocated block of memory.

8. The method of claim 7 wherein mapping the information streams into the plurality of ingress FIFO lanes in memory includes blocking a CSM channel from supplying information streams to its corresponding ingress FIFO lane, in response to that ingress FIFO lane exceeding its fixed and dynamically allocated memory allocation; and,
wherein using the strict priority arbiter to always schedule information streams from the high priority arbiter before information streams from the low priority arbiter includes:
the strict priority arbiter selecting an alternate information stream in response to the CSM channel being blocked; and,
selecting a CSM channel for the alternate information stream.

9. The method of claim 1 further comprising:
receiving processed information streams from the network processor;
storing the processed information streams;
in response to a priority analysis, mapping stored processed information streams to output channels; and,
transmitting processed information streams via the output channels.

10. The method of claim 9 receiving processed information streams from the network processor includes receiving processed information streams via a plurality of network processor channels;
wherein storing the processed information streams includes creating a fixed linkage between each network processor channel and a corresponding egress FIFO lane; and,
wherein mapping stored processed information streams to output channels includes:
establishing a ranked order of egress FIFO lanes; and,
scheduling processed information streams to output channels in response to an evaluation the egress FIFO ranking.

11. The method of claim 10 wherein mapping stored processed information streams to output channels includes:
establishing a fixed memory allocation for each egress FIFO lane; and,
granting a plurality of egress FIFO lanes access to a shared, dynamically allocated block of memory.

12. The method of claim 11 wherein mapping stored processed information streams to output channels includes blocking network processor channel access to a linked egress FIFO lane, in response to that egress FIFO lane exceeding its fixed and dynamically allocated memory allocation.

13. The method of claim 12 wherein transmitting processed information streams via the output channels includes:
an output channel receiving a backpressure signal from a destination receiving a processed information stream; and,
the egress FIFO lane assigned to the output channel ceasing the supply of the processed information stream in response to the backpressure signal.

14. The method of claim 9 wherein transmitting processed information streams via the output channels includes looping a processed information stream back to an input channel for further processing.

15. A channel service manager (CSM) with a system for prioritizing network processor information flow, the system comprising:
a plurality of input channels receiving a plurality of information streams;
a plurality of CSM channels;
an ingress port scheduler comprising a group of arbiters, the ingress port scheduler selectively linking input channels to CSM channels by creating a fixed linkage between a first group of input channels and a first arbiter and between a second group of input channels and a second arbiter, where the first arbiter uses a first selection mechanism to choose between information streams in the first group of input channels and the second arbiter uses a second selection mechanism to choose between information streams in the second group of input channels, the ingress port scheduler scheduling information streams selected by the first and second arbiters in response to the ranking of the arbiter inside the group, and selecting a CSM channel for at least one information stream scheduled by an arbiter;

an ingress CSM storage module having inputs connected to the CSM channels for the storage of information streams in CSM first-in first-out (FIFO) lanes, where at least one CSM ingress FIFO lane has a reserved and dynamic buffer memory allocation to minimize data underflow and dropped in-flight data traffic, the ingress CSM storage module having a plurality of outputs to supply complete packets from the stored information streams;

a processor port scheduler including a group of processor queues, where each processor queue is mapped to a plurality of ingress CSM storage module outputs; and, wherein the group of processor queues supply information streams to an ingress network processor port in an order responsive to a ranking of the processor queues inside the group.

16. The system of claim 15 wherein the ingress CSM storage module includes a plurality of ingress first-in first-out (FIFO) lanes, the ingress CSM storage module creating a fixed linkage between each CSM channel and a corresponding ingress FIFO lane input, and creating a fixed linkage between a set of ingress FIFO lane outputs and a processor queue input.

17. The system of claim 16 wherein the ingress port scheduler includes a group of arbiters, the ingress port scheduler creating a fixed linkage between each input port and an arbiter, scheduling information streams in response to the ranking of the arbiter inside the group, and selecting a CSM channel for each information stream scheduled by an arbiter.

18. The system of claim 17 wherein the ingress port scheduler group of arbiters includes:
a high priority round robin (RR) arbiter having inputs linked to a plurality of input ports, and an output;
a low priority credit-based weighted round robin (WRR) arbiter having inputs linked to a plurality of input ports, and an output; and,
a strict priority arbiter having inputs connected to the high priority and low priority arbiter outputs, and having an output selectively connected to the CSM channels to schedule information streams from the high priority arbiter before information streams from the low priority arbiter.

19. The system of claim 16 wherein the group of processor queues includes:
a high priority processor queue having inputs connected to a plurality of ingress FIFO lane outputs, and an output;
a low priority processor queue having inputs connected to a plurality of ingress FIFO lane outputs, and an output; and,
wherein the processor port scheduler includes a credit-based strict priority arbiter having inputs connected to the high priority and low priority processor queue outputs, an output to supply information streams from the high priority queue until credits are exhausted, and supply information streams from the high and low priority queues in a round robin fashion until the credits are reset.

20. The system of claim 19 wherein the processor port scheduler includes:
a plurality processor queue groups, each processor queue group having outputs connected to a corresponding credit-based strict priority arbiter input; and,
a WRR arbiter having inputs connected to each credit-based strict priority arbiter output, the WRR arbiter supplying information streams from the plurality of processor queue groups to a plurality of ingress network processor ports in a weighted round robin fashion.

21. The system of claim 18 wherein the ingress CSM storage module assigns a fixed memory allocation to each ingress FIFO lane, and grants a plurality of ingress FIFO lanes access to a shared, dynamically allocated block of memory.

22. The system of claim 21 wherein the ingress CSM storage module blocks a CSM channel from supplying information streams to its corresponding ingress FIFO lane, in response to that ingress FIFO lane exceeding its fixed and dynamically allocated memory allocation;
wherein the ingress port scheduler strict priority arbiter selects an alternate information stream in response to the CSM channel being blocked; and,
wherein the ingress port scheduler selects a CSM channel for the alternate information stream.

23. The system of claim 15 further comprising:
an egress CSM storage module having a plurality of inputs to store processed information streams received from an egress network processor port, and a plurality of outputs;
a plurality of output channels;
an egress port scheduler having inputs connected to the egress CSM storage module outputs, the egress port scheduler mapping storing the processed information streams to the output channels in response to a priority analysis; and,
wherein the processed information streams are transmitted via the output channels.

24. The system of claim 23 wherein the egress CSM storage module includes a plurality of egress FIFO lanes, the egress CSM storage module receiving processed information streams via a plurality of egress network processor channels, and creating a fixed linkage between each egress network processor channel and a corresponding egress FIFO lane input; and,
wherein the egress port scheduler establishes a ranked order of egress FIFO lanes, and schedules processed information streams to output channels in response to an evaluation the egress FIFO ranking.

25. The system of claim 24 wherein the egress CSM storage module assigns a fixed memory allocation to each egress FIFO lane, and grants a plurality of egress FIFO lanes access to a shared, dynamically allocated block of memory.

26. The system of claim 25 wherein the egress CSM storage module blocks network processor channel access to a linked egress FIFO lane, in response to that egress FIFO lane exceeding its fixed and dynamically allocated memory allocation.

27. The system of claim 26 wherein an output channel receives a backpressure signal from a destination receiving a processed information stream; and,
wherein the egress FIFO lane assigned to the output channel ceases to supply the processed information stream in response to the backpressure signal.

28. The system of claim 23 wherein the output channels include loop-back connections to the input channels, to supply processed information stream for further processing.

* * * * *